US012620131B2

(12) United States Patent
Wang

(10) Patent No.: US 12,620,131 B2
(45) Date of Patent: May 5, 2026

(54) OPTICAL CENTER DETERMINATION METHOD AND APPARATUS, ELECTRONIC DEVICE, AND MEDIUM

(71) Applicant: ZHEJIANG UNIVIEW TECHNOLOGIES CO., LTD., Zhejiang (CN)

(72) Inventor: Guozhen Wang, Zhejiang (CN)

(73) Assignee: ZHEJIANG UNIVIEW TECHNOLOGIES CO., LTD., Hangzhou (CN)

( * ) Notice: Subject to any disclaimer, the term of this patent is extended or adjusted under 35 U.S.C. 154(b) by 380 days.

(21) Appl. No.: 18/551,324

(22) PCT Filed: Dec. 23, 2021

(86) PCT No.: PCT/CN2021/140671
§ 371 (c)(1),
(2) Date: Sep. 19, 2023

(87) PCT Pub. No.: WO2023/005123
PCT Pub. Date: Feb. 2, 2023

(65) Prior Publication Data
US 2024/0169591 A1 May 23, 2024

(30) Foreign Application Priority Data
Jul. 30, 2021 (CN) .......................... 202110875409.8

(51) Int. Cl.
*G06T 7/80* (2017.01)
*H04N 17/00* (2006.01)

(52) U.S. Cl.
CPC ............. *G06T 7/80* (2017.01); *H04N 17/002* (2013.01)

(58) Field of Classification Search
CPC ...................................................... G06T 7/80
See application file for complete search history.

(56) References Cited

U.S. PATENT DOCUMENTS

2018/0146175 A1    5/2018   Mui

FOREIGN PATENT DOCUMENTS

CN        101207833 A      6/2008
CN        105635573 A      6/2016
(Continued)

OTHER PUBLICATIONS

International Search Report in Application No. PCT/CN2021/140671, dated Apr. 26, 2022, 4 pages, including translation.
(Continued)

*Primary Examiner* — Molly Wilburn
(74) *Attorney, Agent, or Firm* — MASCHOFF BRENNAN

(57) ABSTRACT

Provided are an optical center determination method and apparatus, an electronic device, and a medium. The optical center determination method includes: obtaining at least one reference line by connecting edge points with the largest distance therebetween in a target image; determining, on the at least one reference line, at least two reference points with grayscale values in a preset ratio to a grayscale peak value, and determining the position information of an optical center is according to the at least two reference points and auxiliary points with grayscale values consistent with the grayscale value of a reference point.

15 Claims, 7 Drawing Sheets

Obtain at least one reference line by connecting edge points with the largest distance therebetween in a target image    ⟶ S110

Determine at least two reference points on the at least one reference line, where grayscale values of the at least two reference points are in a preset ratio to a grayscale peak value, and the grayscale peak value is the maximum value among grayscale values of pixel points on the at least one reference line    ⟶ S120

Determine the position information of an optical center according to the at least two reference points and auxiliary points with grayscale values consistent with the grayscale value of a reference point    ⟶ S130

(56)                    References Cited

FOREIGN PATENT DOCUMENTS

| | | | | |
|---|---|---|---|---|
| CN | 106600653 A | 4/2017 | | |
| CN | 106683135 A | 5/2017 | | |
| CN | 106839976 A | * | 6/2017 | ........... G01B 11/002 |
| CN | 108318224 A | 7/2018 | | |
| CN | 108632604 A | 10/2018 | | |
| CN | 111508027 A | 8/2020 | | |
| CN | 112085752 A | 12/2020 | | |
| CN | 112991202 A | 6/2021 | | |
| WO | 2021036280 A1 | 3/2021 | | |

OTHER PUBLICATIONS

Extended European Search Report of Application No. 21951695.2, dated Oct. 18, 2024, 10 pages.
Chinese Office Action for Application No. 202110875409.8, dated May 21, 2025, 9 pages including translation.
Chinese Search Report for Application No. 202110875409.8, dated May 14, 2025, 7 pages including translation.

* cited by examiner

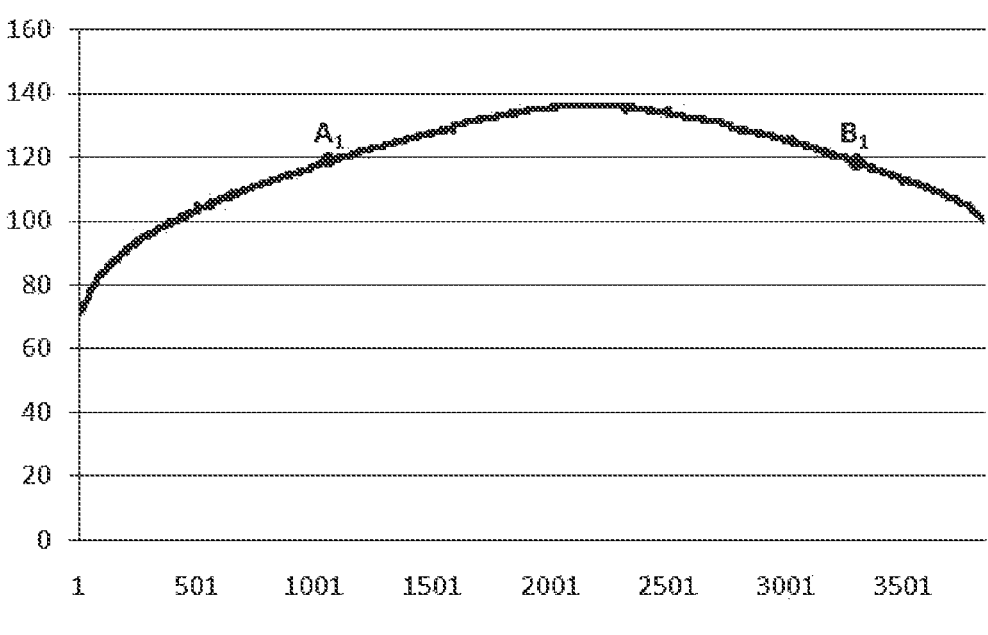

FIG. 3

Obtain at least one reference line by connecting edge points with the largest distance therebetween in a target image  ∿S210

Determine at least two reference points on the at least one reference line, where grayscale values of the at least two reference points are in a preset ratio to a grayscale peak value  ∿S220

Determine, in the same horizontal direction as the reference point and in the same vertical direction as the reference point, points with grayscale values consistent with the grayscale value of a reference point as auxiliary points  ∿S230

Determine midpoints of connection lines between the auxiliary points and a respective reference point among the at least two reference points  ∿S240

Determine the position information of an optical center according to the midpoints  ∿S250

FIG. 4

OPTICAL CENTER DETERMINATION METHOD AND APPARATUS, ELECTRONIC DEVICE, AND MEDIUM

CROSS REFERENCE TO RELATED APPLICATIONS

This is a National Stage Application, filed under 35 U.S.C. § 371 of International Patent Application No. PCT/CN2021/140671, filed Dec. 23, 2021, which claims priority to Chinese Patent application Ser. No. 202110875409.8, filed Jul. 30, 2021, the disclosures of which are incorporated herein by reference in their entireties.

TECHNICAL FIELD

The present application relates to the field of computer vision technology, for example, an optical center determination method and apparatus, an electronic device, and a medium.

BACKGROUND

When a camera shoots an image, the intersection point between the optical axis of a camera lens and the photosensitive plane of a sensor is the optical center of the camera lens. In the conventional use of the camera, the optical center of the lens is located in the center of the image. A large deviation in the position of the optical center of the camera lens may directly affect the image shooting quality of the camera. Therefore, the accurate solving of the position of the optical center of the camera is the premise of adjusting the optical center to be located in the center of the image.

In the related art, a camera is used for shooting a uniform white light plate to obtain a light intensity distribution diagram first. Then the light intensity distribution diagram is converted into a grayscale image. Binarization processing is performed for grayscale values on the grayscale image (data greater than a certain percentage and data less than the percentage are assigned to 1 and 0 respectively). Then coordinates of the optical center are obtained through centroid calculation. However, in this solution, grayscale values of pixel points of the entire image need to be calculated, resulting in large data processing. With the increase of pixel points of the image in an actual scene, this solution may increase the burden of data processing.

SUMMARY

The present application provides an optical center determination method and apparatus, an electronic device, and a medium.

An optical center determination method is provided. The method includes the steps below.

At least one reference line is obtained by connecting edge points with a largest distance therebetween in a target image.

At least two reference points on the at least one reference line are determined. Grayscale values of the at least two reference points are in a preset ratio to a grayscale peak value. The grayscale peak value is a maximum value among grayscale values of pixel points on the at least one reference line.

Position information of an optical center is determined according to the at least two reference points and auxiliary points with grayscale values consistent with a grayscale value of a reference point among the at least two reference points.

An optical center determination apparatus is also provided. The apparatus includes a reference line obtaining module, a reference point determination module, and an optical center position information determination module.

The reference line obtaining module is configured to obtain at least one reference line by connecting edge points with a largest distance therebetween in a target image.

The reference point determination module is configured to determine at least two reference points on the at least one reference line. Grayscale values of the at least two reference points are in a preset ratio to a grayscale peak value. The grayscale peak value is a maximum value among grayscale values of pixel points on the at least one reference line.

The optical center position information determination module is configured to determine position information of an optical center according to the at least two reference points and auxiliary points with grayscale values consistent with a grayscale value of a reference point among the at least two reference points.

An electronic device is also provided. The electronic device includes a memory, a processor, and a computer program stored in the memory and executable on the processor. When executing the computer program, the processor performs the optical center determination method according to embodiments of the present application.

A computer-readable storage medium is also provided. The computer-readable storage medium stores a computer program. When the computer program is executed by a processor, the optical center determination method according to embodiments of the present application is performed.

BRIEF DESCRIPTION OF DRAWINGS

FIG. 3 is a diagram illustrating the determination of reference points according to an embodiment of the present application.

FIG. 4 is a flowchart of an optical center determination method according to another embodiment of the present application.

DETAILED DESCRIPTION

Figure 1:
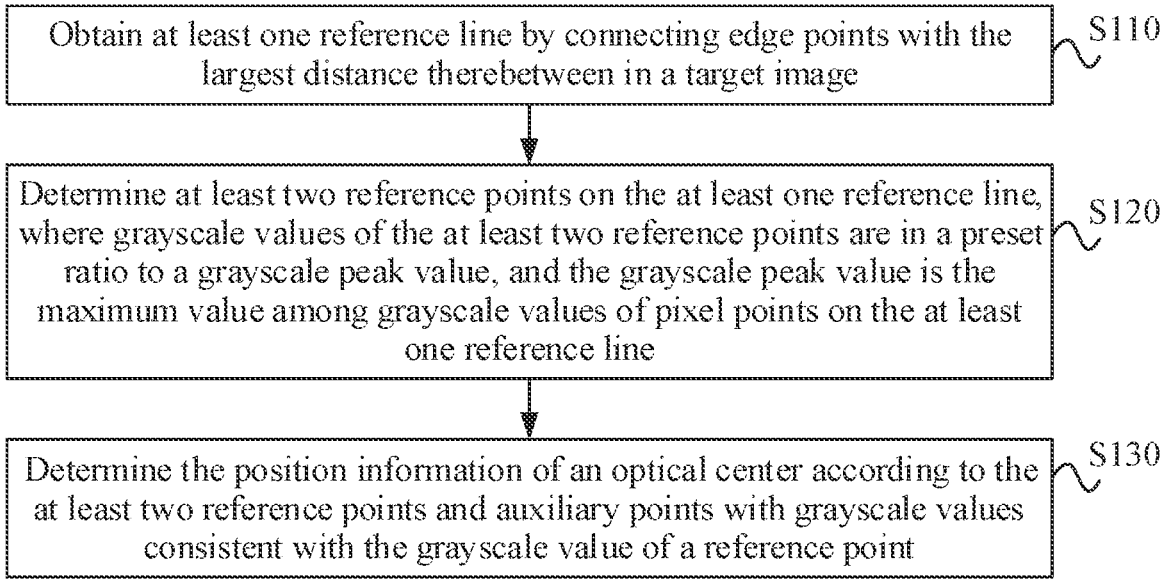
FIG. 1 is a flowchart of an optical center determination method according to an embodiment of the present application.

The present application is described below with reference to drawings and embodiments. The embodiments described herein are intended to explain and not to limit the present application. For ease of description, some part, not all, of structures related to the present application are illustrated in the drawings.

FIG. 1 is a flowchart of an optical center determination method according to an embodiment of the present application. This embodiment is applicable to the scene of determining the position of the optical center of a camera assembly. The method may be performed by an optical center determination apparatus according to an embodiment of the present application. The apparatus may be implemented in the manner of software and/or hardware and may be integrated in an electronic device.

As shown in FIG. 1, the optical center determination method according to this embodiment of the present application may include the steps below.

In S110, at least one reference line is obtained by connecting edge points with the largest distance therebetween in a target image.

The target image may be a grayscale image that is converted from an image obtained by shooting a uniform white light plate through a lens module. The shape of the image may be, for example, rectangular, circular, or oval.

In this embodiment of the present application, the edge points with the largest distance in the target image are connected. Illustratively, if the target image is rectangular, the edge points with the largest distance in the target image are two diagonal points. At least one diagonal obtained by connecting at least a pair of diagonal points is taken as the at least one reference line. If the target image is circular, the edge points with the largest distance in the target image are two endpoints of a diameter passing through the center of a circle. At least one line where at least one diameter in the circle is located is the at least one reference line.

Figure 2:
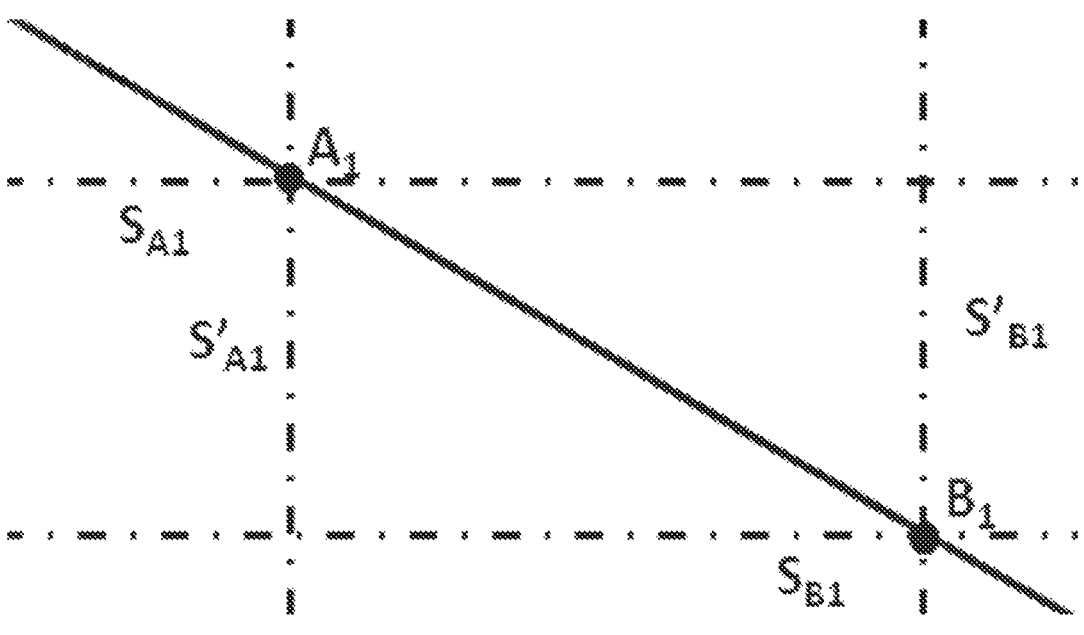
FIG. 2 is a diagram illustrating the determination of a reference line according to an embodiment of the present application.

FIG. 2 is a diagram illustrating the determination of a reference line according to an embodiment of the present application. By way of example, one reference line is illustrated in the figure. The image shown in FIG. 2 is the target image, which is a rectangle. The target image has one reference line, that is, one diagonal of the rectangle.

In S120, at least two reference points on the at least one reference line are determined. Grayscale values of the at least two reference points are in a preset ratio to a grayscale peak value. The grayscale peak value is the maximum value among grayscale values of pixel points on the at least one reference line.

In this embodiment of the present application, the grayscale peak value on the reference line is the maximum value among grayscale values corresponding to multiple pixel points on the reference line. Generally, grayscale values range from 0 to 255; correspondingly, colors in the grayscale image are from black to white. The position of the optical center should be the whitest. Therefore, on the reference line, the grayscale value corresponding to a pixel point closer to the position of the optical center is greater, and the grayscale value of a pixel point farther from the position of the optical center is smaller.

In this embodiment of the present application, the preset ratio may be set empirically or may be calculated according to the actual distribution of grayscale values on the reference line.

The grayscale values of the at least two reference points are the same and are each in the preset ratio to the grayscale peak value. Therefore, the at least two reference points are on one grayscale contour line.

Illustratively, FIG. 3 is a diagram illustrating the determination of reference points according to an embodiment of the present application. As shown in FIG. 3, the curve in FIG. 3 illustrates the distribution of grayscale values corresponding to pixel points on the reference line in FIG. 2. An abscissa represents the N-th pixel point on the reference line. An ordinate represents the grayscale value corresponding to the N-th pixel point on the reference line. $A_1$ and $B_1$ are reference points, on the reference line in FIG. 2, whose grayscale values are in the preset ratio to the grayscale peak value of the reference line. The grayscale value of $A_1$ and the grayscale value of $B_1$ are on the same contour line in the curve.

The smaller the preset ratio, the greater the difference between the grayscale peak value and the grayscale values of the at least two reference points on the reference line, and the greater the distance between the at least two reference points and the point with the grayscale peak value. On the contrary, the greater the preset ratio, the smaller the difference between the grayscale peak value and the grayscale values of the at least two reference points on the reference line, and the smaller the distance between the at least two reference points and the point with the grayscale peak value.

In this embodiment of the present application, the determination process of the preset ratio includes the steps below.

A first difference value between the grayscale peak value and the grayscale value of a target endpoint on the reference line is determined. The target endpoint is an endpoint with a larger grayscale value among two endpoints of the reference line.

A product value of the first difference value and a preset coefficient is determined, and a second difference value between the grayscale peak value and the product value is determined. The preset coefficient is in the range of (0, 1).

A ratio of the second difference value to the grayscale peak value is determined as the preset ratio.

The target endpoint on the reference line refers to the pixel point with the largest grayscale value among pixel points at the first endpoint and the last endpoint on the reference line. Illustratively, the preset ratio may be expressed through the formula below.

The preset ratio=$(S_{max}(x, y)-(S_{max}(x, y)-MAX(S(1, 1), S(x, y)))/N)/S_{max}(x, y)$ $S(1, 1)$ denotes the grayscale value of a pixel point at an endpoint on one end of the reference line. $S(x, y)$ denotes the grayscale value of a pixel point at an endpoint on the other end of the reference line. $S_{max}(x, y)$ denotes the grayscale peak value on the reference line. $1/N$ denotes the preset coefficient.

When $S(1, 1)>S(x, y)$, the endpoint corresponding to $S(1, 1)$ is the target endpoint. When $S(1, 1)<S(x, y)$, the endpoint corresponding to $S(x, y)$ is the target endpoint. When $S(1, 1)=S(x, y)$, each of the endpoint corresponding to $S(1, 1)$ or the endpoint corresponding to $S(x, y)$ may serve as the target endpoint.

In the preceding formula, a value obtained by $S_{max}(x, y)-MAX(S(1, 1), S(x, y))$ is the first difference value. A value obtained by $(S_{max}(x, y)-MAX(S(1, 1), S(x, y)))/N$ is the product value. A value obtained by $S_{max}(x, y)-(S_{max}(x, y)-MAX(S(1, 1), S(x, y)))/N$ is the second difference value. In this embodiment of the present application, a target grayscale value is determined according to the grayscale peak value and the preset ratio. At least two reference points whose grayscale values are the same as the target grayscale value are determined on the reference line.

In this embodiment of the present application, N is a number greater than 1, for example, 2, 3, and 5/4, and may determine positions of the reference points in the target image. When N is excessively great, the reference points are close to edges of the image. When N is excessively small, the reference points are close to each other. It is not the best position for determining the optical center that the reference points are close to each other or close to the edges of the image. Therefore, N may be adaptively determined according to the grayscale distribution on the reference line so that the reference points are located in proper positions of the target image. For example, for the reference points shown in FIG. 2, the N value of the reference points is selected to be 2.

In this embodiment of the present application, the step in which the at least two reference points, on the at least one reference line are determined, grayscale values of the at least two reference points are in the preset ratio to the grayscale peak value, includes the steps below.

The target grayscale value is determined according to a product of the grayscale peak value and the preset ratio.

At least two points, on the at least one reference line, with grayscale values consistent with the target grayscale value are determined as the at least two reference points.

In this embodiment of the present application, the product of the grayscale peak value and the preset ratio may be taken as the target grayscale value directly. Alternatively, a product of the grayscale peak value, the preset ratio, and a preset adjustment coefficient may be taken as the target grayscale value. The adjustment coefficient may be determined according to an actual situation.

In the present application, the at least two reference points are determined according to the grayscale peak value and the preset ratio, thereby adaptively determining points which are located in proper positions of the image and whose grayscale values are the same and are located on the same grayscale contour line, that is, determining points on a concentric circle of an edge of an optical spot where the optical center is located. Accordingly, the position of the optical center is determined quickly and accurately based on as few pixel points as possible.

In S130, the position information of the optical center is determined according to the at least two reference points and auxiliary points with grayscale values consistent with the grayscale value of a reference point.

Illustratively, a midpoint between an auxiliary point and the reference point may be determined on a connection line connecting the auxiliary point and the reference point. Moreover, midpoints of disjoint connection lines are connected to obtain an intersection point, so that the position of the obtained intersection point is the position of the optical center. In the case of more than two intersection points, the position information of the optical center may be determined through solutions such as finding an intermediate point between the intersection points.

In this embodiment, the position of the optical center of the camera assembly is determined by the following method: at least one reference line is obtained by connecting edge points with the largest distance therebetween in a target image; at least two reference points, on the at least one reference line, with grayscale values in a preset ratio to a grayscale peak value are determined; and the position information of the optical center is determined according to the reference points and auxiliary points with grayscale values consistent with the grayscale value of a reference point. For the optical center calculation solution according to this embodiment, not all pixel points need to be calculated. The position of the optical center can be determined by calculating a small amount of data, thereby effectively reducing the burden of data processing. For a scene with more and more pixel points in a current image, this solution enables the position of the optical center to be determined more quickly. Moreover, reference points determined in this solution are points on the same grayscale contour line. Therefore, the reference points are on a concentric circle of the optical spot where the optical center is located. The position of the optical center can be determined more accurately according to the reference points on the concentric circle.

FIG. 4 is a flowchart of an optical center determination method according to another embodiment of the present application. This embodiment is described based on the preceding embodiment. The step in which the position information of the optical center is determined according to the reference points and auxiliary points with grayscale values consistent with the grayscale value of a reference point includes the following steps: points with grayscale values consistent with the grayscale value of the reference point are determined in the same horizontal direction as the reference point and in the same vertical direction as the reference point as the auxiliary points; midpoints of connection lines between the auxiliary points and a respective reference point among the at least two reference points are determined; and the position information of the optical center is determined according to the midpoints.

As shown in FIG. 4, the optical center determination method according to this embodiment of the present application may include the steps below.

In S210, at least one reference line is obtained by connecting edge points with the largest distance therebetween in a target image.

In S220, at least two reference points on at least one reference line are determined. Grayscale values of the at least two reference points are in a preset ratio to a grayscale peak value.

In S230, points with grayscale values consistent with the grayscale value of a reference point, in the same horizontal direction as the reference point and in the same vertical direction as the reference point, are determined as auxiliary points.

Figure 5:
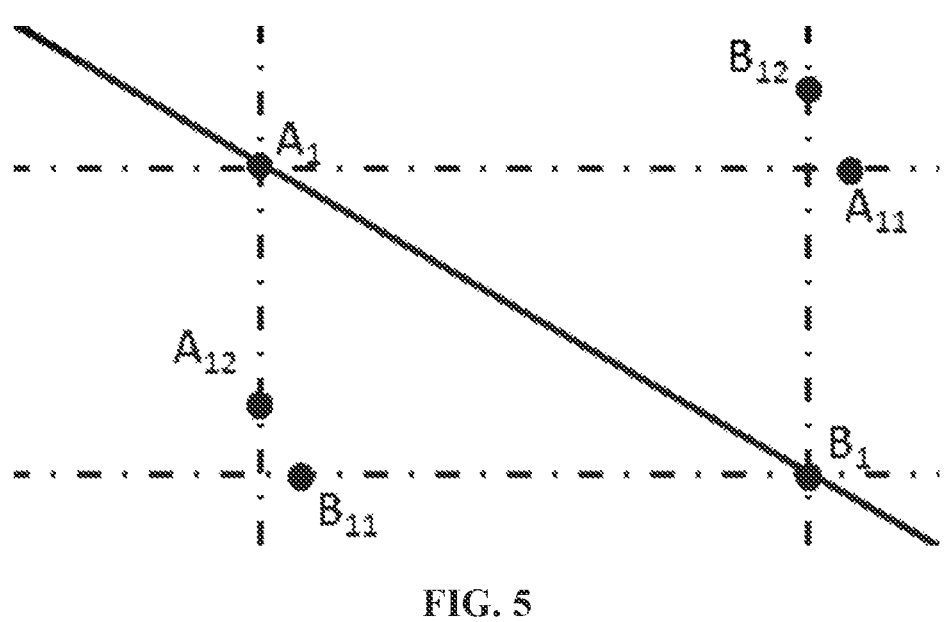
FIG. 5 is a diagram illustrating the determination of auxiliary points according to another embodiment of the present application.

Illustratively, FIG. 5 is a diagram illustrating the determination of auxiliary points according to another embodiment of the present application. By way of example, one reference line is illustrated in FIG. 5. As shown in FIG. 5, $A_{11}$ is an auxiliary point of reference point $A_1$ in the same horizontal direction as the reference point $A_1$. $A_{12}$ is an auxiliary point of reference point $A_1$ in the same vertical direction as the reference point $A_1$. The grayscale value of $A_{11}$ and the grayscale value of $A_{12}$ are consistent with the grayscale value of $A_1$. $B_{11}$ is an auxiliary point of reference point $B_1$ in the same horizontal direction as the reference point $B_1$. $B_{12}$ is an auxiliary point of reference point $B_1$ in the same vertical direction as the reference point $B_1$. The grayscale value of $B_{11}$ and the grayscale value of $B_{12}$ are consistent with the grayscale value of $B_1$.

In S240, midpoints of connection lines between the auxiliary points and a respective reference point among the at least two reference points are determined.

Figure 6:
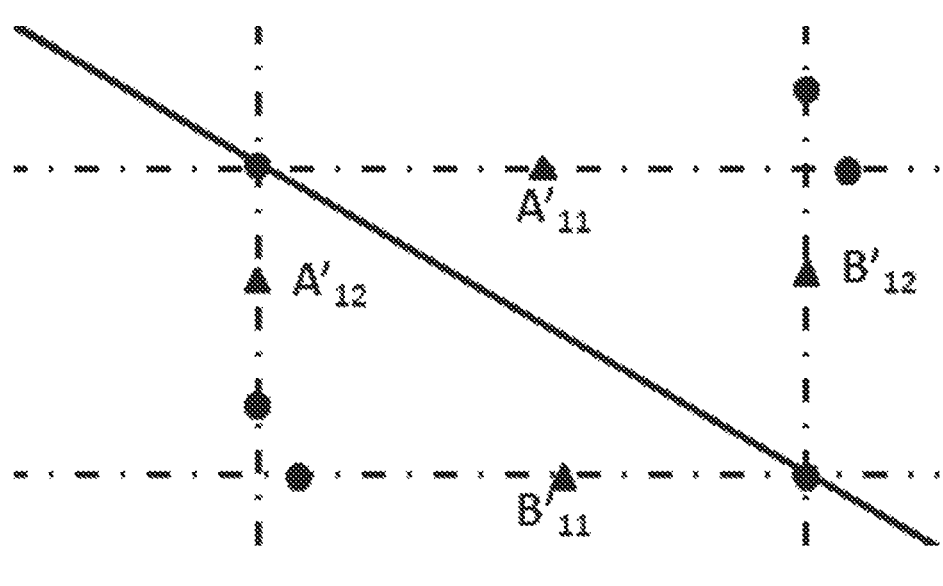
FIG. 6 is a diagram illustrating the determination of midpoints according to another embodiment of the present application.

In this embodiment of the present application, positions of the midpoints of the connection lines between the reference point and the auxiliary points of the reference point may be determined by establishing a coordinate system. Illustratively, reference point $A_1$ and auxiliary points $A_{11}$ and $A_{12}$ of reference point $A_1$ in FIG. 5 are taken for example. As shown in FIG. 5, coordinates of $A_1$ are $(x_{A1}, y_{A1})$. Coordinates of $A_{11}$ and coordinates of $A_{12}$ are $(x_{A11}, y_{A11})$ and $(x_{A12}, y_{A12})$ respectively. In this case, coordinates of a midpoint of a connection line between $A_1$ and $A_{11}$ are $(x_{A1}+(x_{A11}-x_{A1})/2, y_{A1})$. Coordinates of a midpoint of a connection line between $A_1$ and $A_{12}$ are $(x_{A1}, y_{A12}+(y_{A1}-y_{A12})/2)$. FIG. 6 is a diagram illustrating the determination of midpoints according to another embodiment of the present application. In FIG. 6, $A'_{11}$ is a midpoint of a connection line between reference point $A_1$ and auxiliary point $A_{11}$ of reference point $A_1$ in FIG. 5; $A'_{12}$ is a midpoint of a connection line between reference point $A_1$ and auxiliary point $A_{12}$ of reference point $A_1$ in FIG. 5; $B'_{11}$ is a midpoint of a connection line between reference point $B_1$ and auxiliary point $B_{11}$ of reference point $B_1$ in FIG. 5; and $B'_{12}$ is a midpoint of a connection line between reference point $B_1$ and auxiliary point $B_{12}$ of reference point $B_1$ in FIG. 5.

In S250, the position information of an optical center is determined according to the midpoints.

In this embodiment of the present application, the step in which the position information of the optical center is determined according to the midpoints includes the steps below.

At least two auxiliary lines are obtained by connecting midpoints respectively belonging to disjoint connection lines among the connecting lines.

The position information of the optical center is determined according to an intersection point of the at least two auxiliary lines.

Figure 7:
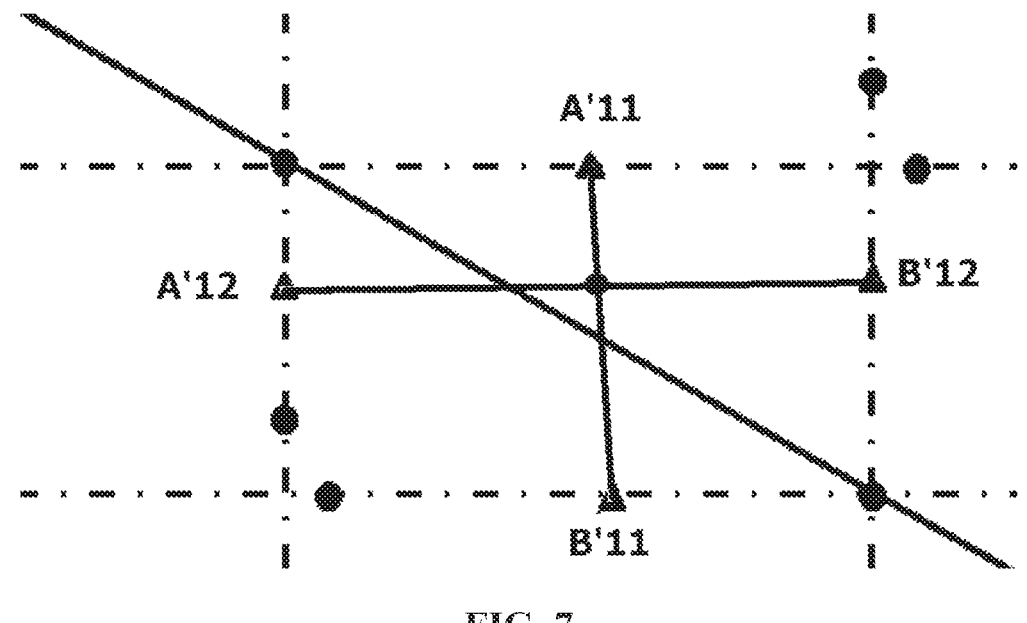
FIG. 7 is a diagram illustrating the determination of auxiliary lines according to another embodiment of the present application.

The disjoint connection lines are disjoint connection lines among the connection lines between all reference points and auxiliary points of the reference points. Illustratively, FIG. 7 is a diagram illustrating the determination of auxiliary lines according to another embodiment of the present application. By way of example, one reference line is illustrated in the FIG. 7. As shown in FIG. 7, $A'_{11}$, $A'_{12}$, $B'_{11}$, and B'12 are each a midpoint of a connection line between a reference point and a respective auxiliary point. It can be seen from the figure that a connection line where $A'_{12}$ is located and a connection line where $B'_{12}$ is located are disjoint and that a connection line where $B'_{11}$ is located and a connection line where $A'_{11}$ is located are disjoint. Therefore, $B'_{11}$ is connected to $A'_{11}$, and $A'_{12}$ is connected to $B'_{12}$ so that two auxiliary lines are obtained. Then the position of an intersection point of the two auxiliary lines is the position of the optical center.

In this embodiment of the present application, the step in which the position information of the optical center is determined according to the reference points and auxiliary points with grayscale values consistent with the grayscale value of a reference point, includes the step below.

If an optical spot where the optical center is located is circular, the position information of the optical center is determined according to perpendicular bisectors of connection lines between the reference points and respective auxiliary points.

The optical spot is a pattern shape fitted by connecting the reference points and the auxiliary points. If the optical spot is circular, the position where an intersection point of the perpendicular bisectors of the connection lines between the reference points and the auxiliary points is the position of the optical center.

In this embodiment, the position of the optical center of the camera assembly is determined by the following method: points with grayscale values consistent with the grayscale value of a reference point, in the same horizontal direction as the reference point and in the same vertical direction as the reference point, are determined as auxiliary points; midpoints of connection lines between the auxiliary points and the reference point are determined; and the position information of the optical center is determined according to the midpoints. For the optical center calculation solution according to this embodiment, not all pixel points need to be calculated. The position of the corresponding optical center can be obtained by calculating a small amount of data, thereby effectively reducing the burden of data processing. For a scene with more and more pixel points in a current image, this solution enables the position of the optical center to be determined more quickly.

Figure 8:
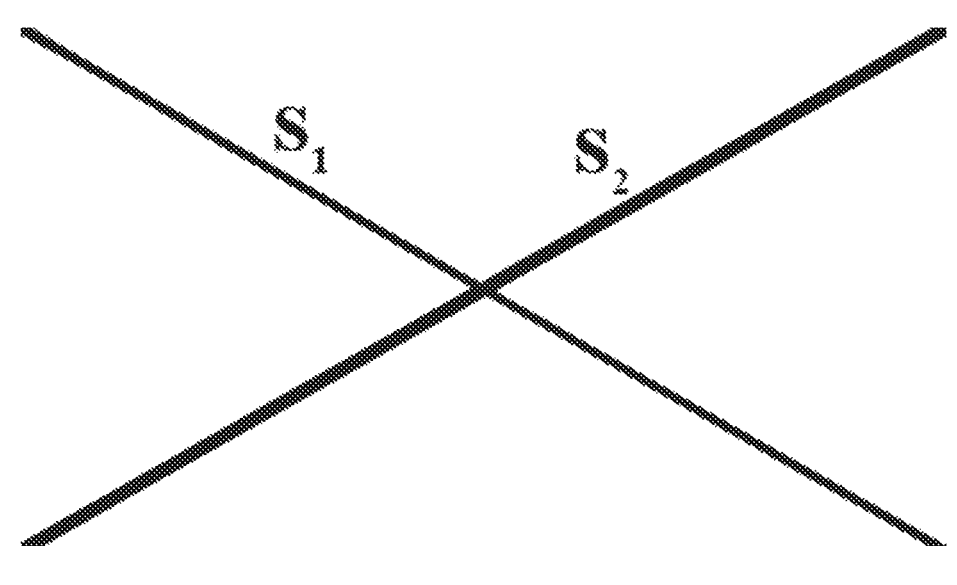
FIG. 8 is a diagram illustrating the determination of reference lines according to another embodiment of the present application.
Figure 9:
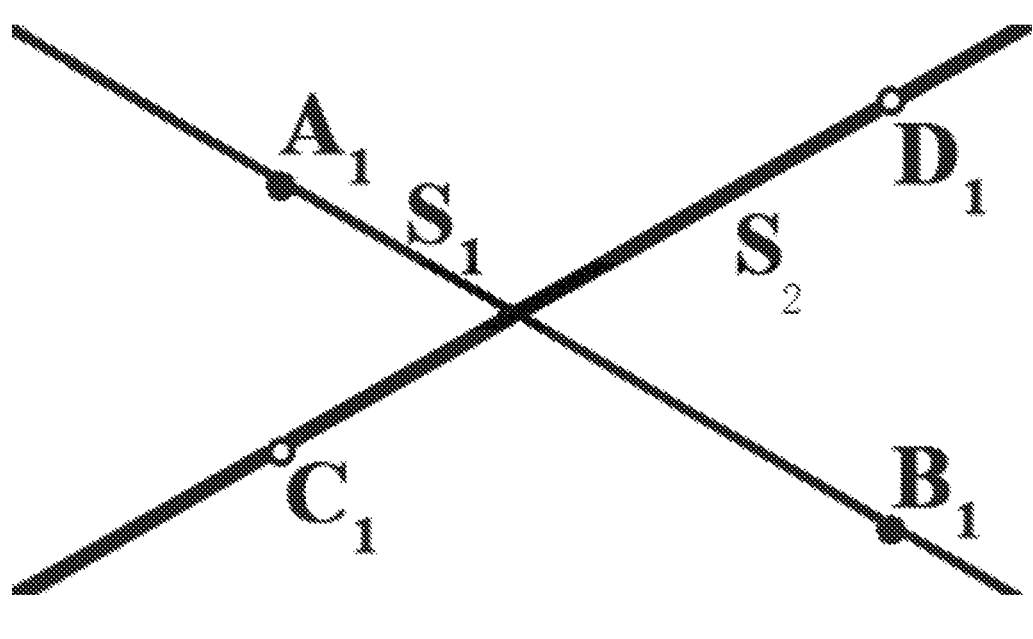
FIG. 9 is a diagram illustrating the determination of reference points according to another embodiment of the present application.

Another embodiment of the present application provides an optical center determination method. Two reference lines are taken for example to describe the optical center determination method of the present application, which is applicable to the case where an optical spot where an optical center is located is close to an edge of a target image or the case where an optical spot where an optical center is located is on one side of one reference line. FIG. 8 is a diagram illustrating the determination of reference lines according to another embodiment of the present application. FIG. 9 is a diagram illustrating the determination of reference points according to another embodiment of the present application. By way of example, two reference lines are illustrated in FIGS. 8 and 9.

The image shown in FIG. 8 is the target image, which is a rectangle. Two reference lines are in the target image, that is, two diagonals of the rectangle. S1 is a set of grayscale values corresponding to pixel points on one reference line. S2 is a set of grayscale values corresponding to pixel points on the other reference line. In FIGS. 9, $A_1$ and $B_1$ are reference points on one reference line, and $C_1$ and $D_1$ are reference points on the other reference line. The grayscale value of $A_1$ and the grayscale value of $B_1$ are in a preset ratio to a grayscale peak value of the reference line where $A_1$ and $B_1$ are located. The grayscale value of $C_1$ and the grayscale value of $D_1$ are in a preset ratio to a grayscale peak value of the reference line where $C_1$ and $D_1$ are located.

Figure 10:
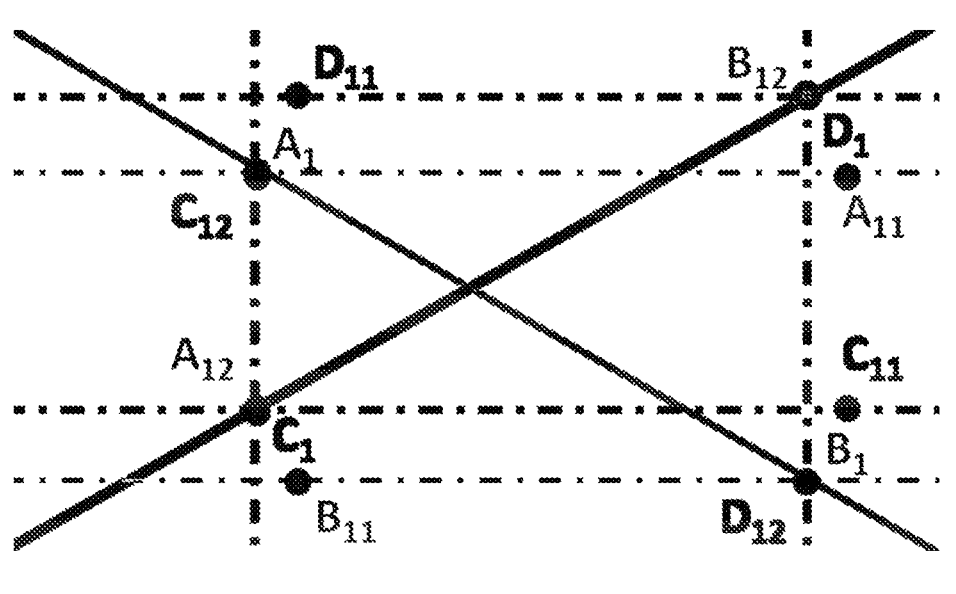
FIG. 10 is a diagram illustrating the determination of auxiliary points according to another embodiment of the present application.

FIG. 10 is a diagram illustrating the determination of auxiliary points according to another embodiment of the present application. By way of example, two reference lines are illustrated in the figure. As shown in FIG. 10, $A_{11}$ is an auxiliary point of reference point $A_1$ in the same horizontal direction as the reference point $A_1$. $A_{12}$ is an auxiliary point of reference point $A_1$ in the same vertical direction as the reference point $A_1$. The grayscale value of $A_{11}$ and the grayscale value of $A_{12}$ are consistent with the grayscale value of $A_1$. $B_{11}$ is an auxiliary point of reference point $B_1$ in the same horizontal direction as the reference point $B_1$. $B_{12}$ is an auxiliary point of reference point $B_1$ in the same vertical direction as the reference point $B_1$. The grayscale value of $B_{11}$ and the grayscale value of $B_{12}$ are consistent with the grayscale value of $B_1$. $C_1$ is an auxiliary point of reference point $C_1$ in the same horizontal direction as the reference point $C_1$. $C_{12}$ is an auxiliary point of reference point $C_1$ in the same vertical direction as the reference point $C_1$. The grayscale value of $C_{11}$ and the grayscale value of $C_{12}$ are consistent with the grayscale value of $C_1$. $D_{11}$ is an auxiliary point of reference point $D_1$ in the same horizontal direction as the reference point $D_1$. $D_{12}$ is an auxiliary point of reference point $D_1$ in the same vertical direction as the reference point $D_1$. The grayscale value of $D_{11}$ and the grayscale value of $D_{12}$ are consistent with the grayscale value of $D_1$.

In FIG. 10, $A_1$ coincides with $C_{12}$. $D_1$ coincides with $B_{12}$. $C_1$ coincides with $A_{12}$. $B_1$ coincides with $D_{12}$.

Figure 11:
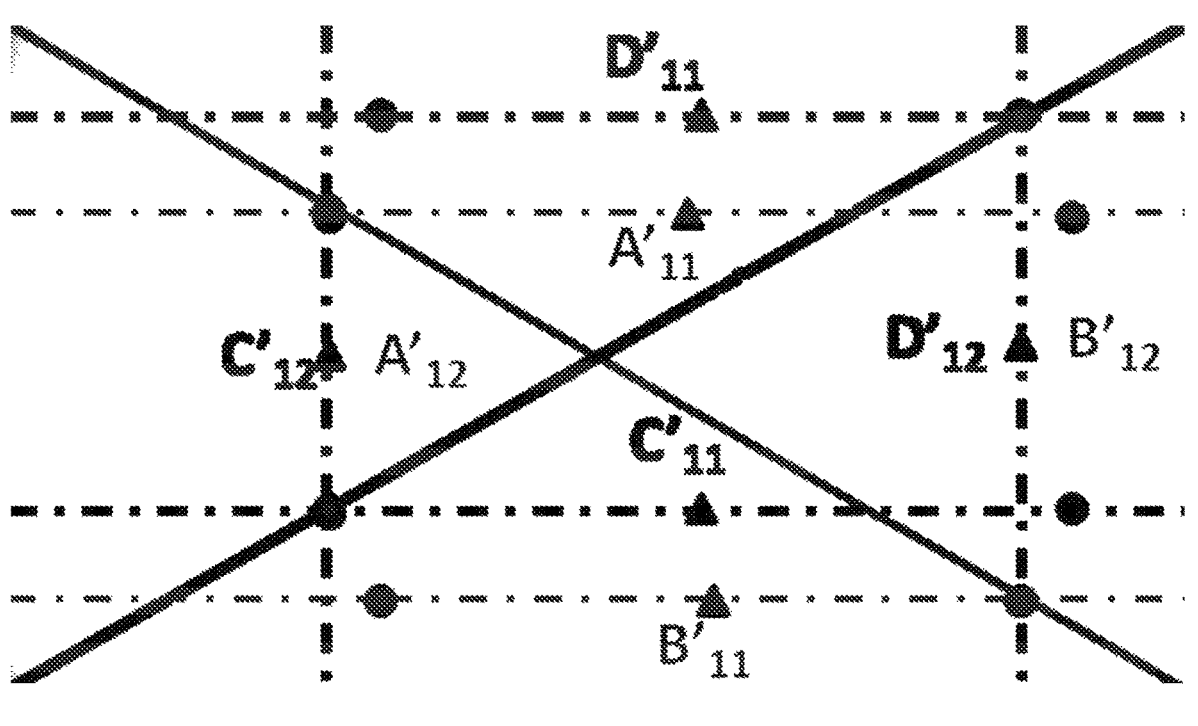
FIG. 11 is a diagram illustrating the determination of midpoints according to another embodiment of the present application.
Figure 12:
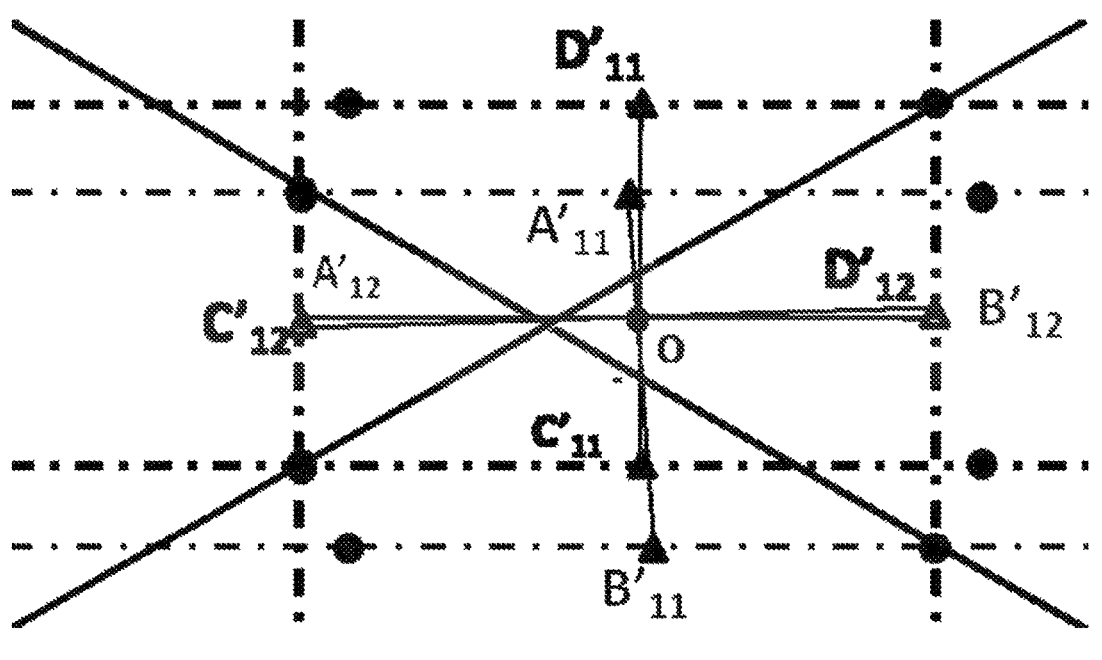
FIG. 12 is a diagram illustrating the determination of auxiliary points according to another embodiment of the present application.

FIG. 11 is a diagram illustrating the determination of midpoints according to another embodiment of the present application. FIG. 12 is a diagram illustrating the determination of auxiliary points according to another embodiment of the present application. By way of example, two reference lines are illustrated in FIGS. 11 and 12. As shown in FIG. 11, $A'_{11}$, $A'_{12}$, $B'_{11}$, $B'_{12}$, $C'_{11}$, $C'_{12}$, $D'_{11}$, and $D'_{12}$ are each a midpoint of a connection line between a reference point and a respective auxiliary point. It can be seen from the figure that a connection line where $C'_{11}$ is located and a connection line where $D'_{11}$ is located are disjoint, that a connection line where $B'_{11}$ is located and a connection line where $A'_{11}$ is located are disjoint, and that the rest can be done in the same manner. At least two auxiliary lines are obtained by connecting midpoints respectively belonging to disjoint connection lines, as shown in FIG. 12. The position of point O in FIG. 12 is the position of an intersection point of the at least two auxiliary lines, that is, the position of the optical center.

In this embodiment of the present application, the at least two auxiliary lines include at least four auxiliary lines.

The step in which the position information of the optical center is determined according to the intersection point of the at least two auxiliary lines includes the step below.

If the at least four auxiliary lines have at least two intersection points, the position information of the optical center is determined according to the average value of the at least two intersection points.

The average value of the at least two intersection points may be the average value of position coordinates of the at least two intersection points. For example, when intersection points $A(x_1, y_1)$ and $B(x_2, y_2)$ exist, average-value coordinates of coordinates of A and coordinates of B are $((x_1+x_2)/2, (y_1+y_2)/2)$. Such coordinates are the position information of the optical center.

For the solution in this embodiment of the present application, in the case where the optical spot is not in the center region of the target image, by using the at least two reference lines, pixel points with a large grayscale distribution range are accurately obtained so as to more accurately determine reference points located on a grayscale contour line, thereby improving the accuracy of determining the optical center.

Figure 13:
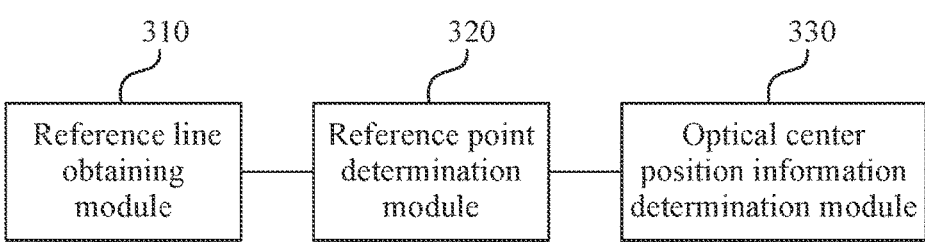
FIG. 13 is a block view of an optical center determination apparatus according to an embodiment of the present application.

FIG. 13 is a block view of an optical center determination apparatus according to an embodiment of the present application. The apparatus can execute the optical center determination method according to any embodiment of the present application and has functional modules and effects corresponding to the method performed. As shown in FIG. 13, the apparatus may include the modules below.

The reference line obtaining module 310 is configured to obtain at least one reference line by connecting edge points with the largest distance therebetween in a target image.

The reference point determination module 320 is configured to determine at least two reference points on the at least one reference line. Grayscale values of the at least two reference points are in a preset ratio to a grayscale peak value. The grayscale peak value is the maximum value among grayscale values of pixel points on the at least one reference line.

The optical center position information determination module 330 is configured to determine the position information of an optical center according to the at least two reference points and auxiliary points with whose grayscale values consistent with the grayscale value of a reference point.

In this embodiment of the present application, the reference point determination module 320 includes a target grayscale value determination unit and a reference point determination unit.

The target grayscale value determination unit is configured to determine a target grayscale value according to a product of the grayscale peak value and the preset ratio.

The reference point determination unit is configured to determine, on the at least one reference line, at least two points with grayscale values consistent with the target grayscale value as the at least two reference points.

In this embodiment of the present application, the apparatus further includes a preset ratio determination module configured to determine the preset ratio. The preset ratio determination module includes a first difference value determination unit, a second difference value determination unit, and a ratio determination unit.

The first difference value determination unit is configured to determine a first difference value between the grayscale peak value and the grayscale value of a target endpoint on the reference line. The target endpoint is an endpoint with a larger grayscale value among two endpoints of the reference line.

The second difference value determination unit is configured to determine a product value of the first difference value and a preset coefficient and determine a second difference value between the grayscale peak value and the product value. The preset coefficient is in the range of $(0, 1)$.

The ratio determination unit is configured to determine a ratio of the second difference value to the grayscale peak value as the preset ratio.

In this embodiment of the present application, the optical center position information determination module 330 includes an auxiliary point determination unit, a midpoint determination unit, and an optical center position information determination unit.

The auxiliary point determination unit is configured to determine, in the same horizontal direction as the reference point and in the same vertical direction as the reference point, points with grayscale values consistent with the grayscale value of the reference point as the auxiliary points.

The midpoint determination unit is configured to determine midpoints of connection lines between the auxiliary points and a respective reference point among the at least two reference points.

The optical center position information determination unit is configured to determine the position information of the optical center according to the midpoints.

In this embodiment of the present application, the optical center position information determination unit is configured to: obtain at least two auxiliary lines by connecting midpoints respectively belonging to disjoint connection lines among the connection lines; and determine the position information of the optical center according to an intersection point of the at least two auxiliary lines.

In this embodiment of the present application, the at least two auxiliary lines are at least four auxiliary lines. In this embodiment of the present application, the optical center position information determination unit is configured to: if the at least four auxiliary lines have at least two intersection points, determine the position information of the optical center according to the average value of the at least two intersection points.

In this embodiment of the present application, the optical center position information determination module 330 is configured to: if an optical spot where the optical center is located is circular, determine the position information of the optical center according to perpendicular bisectors of connection lines between the reference points and respective auxiliary points.

The preceding product can execute the optical center determination method according to embodiments of the present application and has functional modules and effects corresponding to the method performed.

Figure 14:
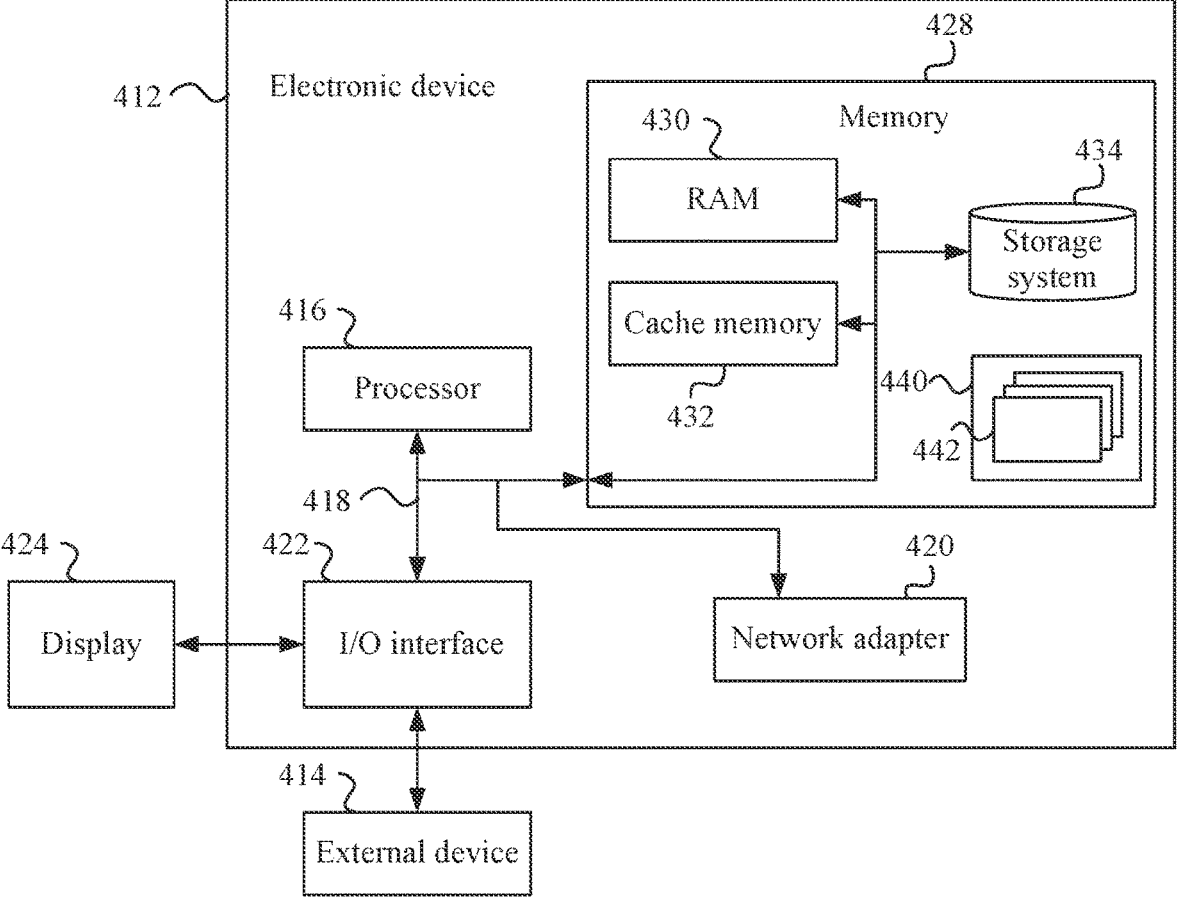
FIG. 14 is a structural diagram of an electronic device according to an embodiment of the present application.

FIG. 14 is a structural diagram of an electronic device according to an embodiment of the present application. FIG. 14 illustrates a block diagram of an electronic device 412 for implementing embodiments of the present application. The electronic device 412 shown in FIG. 14 is an example and is not intended to limit the function and use scope of embodiments of the present application.

As shown in FIG. 14, the electronic device 412 may include one or more processors 416 and a memory 428 configured to store one or more programs. When executing the one or more programs, the one or more processors 416 perform the optical center determination method according to embodiments of the present application. The optical center determination method includes steps below.

At least one reference line is obtained by connecting edge points with the largest distance therebetween in a target image.

At least two reference points on the at least one reference line are determined, Grayscale values of the at least two reference points are in a preset ratio to a grayscale peak value. The grayscale peak value is the maximum value among grayscale values of pixel points on the at least one reference line.

The position information of an optical center is determined according to the at least two reference points and auxiliary points with grayscale values consistent with the grayscale value of a reference point.

Components of the electronic device 412 may include one or more processors 416, a memory 428, and a bus 418 connecting different device components (including the memory 428 and the one or more processors 416).

The bus 418 represents one or more of several-type bus structures, including a memory bus or memory controller, a peripheral bus, an accelerated graphics port and a processor, or represents a local bus using any one of multiple bus structures. For example, such architectures include an Industry Standard Architecture (ISA) bus, a Micro Channel Architecture (MCA) bus, a processing-type ISA bus, a Video Electronics Standards Association (VESA) local bus, and a Peripheral Component Interconnect (PCI) bus.

The electronic device 412 includes multiple computer device readable storage media. These storage media may be available storage media that can be accessed by the electronic device 412. These media include volatile and non-volatile media, and removable and non-removable storage media. A storage medium may be a non-transitory storage medium.

The memory 428 may include a computer device readable storage medium in the form of a volatile memory, such as a random-access memory (RAM) 430 and/or a cache memory 432. The electronic device 412 may include other removable/non-removable, volatile/non-volatile computer device storage media. As an example, a storage system 434 may be configured to perform reading and writing on a non-removable and non-volatile magnetic storage medium (not shown in FIG. 14 and usually referred to as a "hard disk driver"). Although not shown in FIG. 14, a magnetic disk drive for reading from or writing to removable, non-volatile magnetic media (for example, a "floppy disk"), and an optical disk drive for reading from or writing to a removable, non-volatile optical disk (for example, a compact disc read-only memory (CD-ROM), a digital video disc-read only memory (DVD-ROM), or other optical media) may be provided. In these cases, each driver may be connected to the bus 418 by one or more data storage medium interfaces. The memory 428 may include at least one program product having a group of program modules (for example, at least one program module). Such program modules are configured to perform functions of multiple embodiments of the present application.

Program/utility 440, having a set (at least one) of program modules 442, may be stored in the memory 428. Such operation modules 442 include, by way of example, an operating device, one or more application programs, other program modules, and program data. Each of the exemplary operation modules 1142 or some combination thereof may include an implementation of a networking environment. The program modules 442 generally perform functions and/or methods in embodiments of the present application.

The electronic device 412 may also communicate with one or more external devices 414 and/or a display 424. The electronic device 412 may also communicate with one or more devices that enable a user to interact with the electronic device 412 and/or communicate with any device (for example, a network card and a modem) that enables the electronic device 412 to communicate with one or more other computing devices. Such communication may be performed through an input/output (I/O) interface 422. Moreover, the electronic device 412 may also communicate with one or more networks (for example, a local area network (LAN), a wide area network (WAN), and/or a public network such as the Internet) through a network adapter 420. As shown in FIG. 14, the network adapter 420 communicates with other modules of the electronic device 412 via the bus 418. Although not shown in FIG. 14, other hardware and/or software modules may be used in conjunction with the electronic device 412. Such other hardware and/or software modules include, for example, a microcode, a device driver, a redundant processor, an external disk drive array, a redundant arrays of independent disks (RAID) device, a tape driver, and a data backup storage device.

The one or more processors 416 execute at least one of other programs among multiple programs stored in the memory 428 to perform multiple functional applications and data processing, for example, to perform the optical center determination method according to embodiments of the present application.

Embodiment five of the present application provides a storage medium including a computer-executable instruction which, when executed by a computer processor, is configured to perform the optical center determination method. The method includes the steps below.

At least one reference line is obtained by connecting edge points with the largest distance therebetween in a target image.

At least two reference points on the at least one reference line are determined. Grayscale values of the at least two reference points are in a preset ratio to a grayscale peak value. The grayscale peak value is the maximum value among grayscale values of pixel points on the at least one reference line.

The position information of an optical center is determined according to the at least two reference points and auxiliary points with grayscale values consistent with the grayscale value of a reference point.

A computer storage medium in the embodiment of the present application may adopt any combination of one or more computer-readable storage media. A computer-readable storage medium may be a computer-readable signal storage medium or a computer-readable storage medium. The computer-readable storage medium may be an electronic, magnetic, optical, electromagnetic, infrared or semiconductor device, apparatus or element, or any combination thereof. The storage medium may be a non-transitory storage medium. More specific examples of the computer-readable storage medium include an electrical connection having one or more wires, a portable computer magnetic disk, a hard disk, a RAM, a read-only memory (ROM), an erasable programmable read-only memory (EPROM), a flash memory, an optical fiber, a portable CD-ROM, an optical memory element, a magnetic memory element, or any suitable combination thereof. In embodiments of the present application, the computer-readable storage medium may be any tangible medium including or storing a program. The program may be used by or in conjunction with an instruction execution device, apparatus, or element.

A computer-readable signal storage medium may include a data signal propagated in a baseband or as part of a carrier. Computer-readable program codes are carried in the data signal. This propagated data signal may take a plurality of forms including an electromagnetic signal, an optical signal, or any suitable combination thereof. The computer-readable signal storage medium may also be any computer-readable storage medium except the computer-readable storage medium. The computer-readable storage medium may send, propagate or transmit a program used by or used in conjunction with an instruction execution device, apparatus, or element.

The program codes embodied in the computer-readable storage medium may be transmitted using any appropriate medium, including for example, wireless, wireline, optical fiber cable, radio frequency (RF), or any appropriate combination thereof.

Computer program codes for performing the operations of the present application may be written in one or more programming languages or a combination thereof, the programming languages including object-oriented programming languages such as Java, Smalltalk, C++ and further including conventional procedural programming languages such as C programming language or similar programming languages. The program codes may be executed entirely or partially on a user computer, as a separate software package, partially on the user computer and partially on a remote computer, or entirely on the remote computer or device. In the scenario involving the remote computer, the remote computer may be connected to the user computer through any type of network, including a LAN or a WAN, or the connection may be made to an external computer (for example, through the Internet using an Internet service provider).

What is claimed is:

1. An optical center determination method, comprising:
   obtaining at least one reference line by connecting edge points with a largest distance therebetween in a target image;

determining at least two reference points on the at least one reference line, wherein grayscale values of the at least two reference points are in a preset ratio to a grayscale peak value, wherein the grayscale peak value is a maximum value among grayscale values of pixel points on the at least one reference line; and determining position information of an optical center according to the at least two reference points and auxiliary points with grayscale values consistent with a grayscale value of a reference point among the at least two reference points;

wherein determining the position information of the optical center according to the at least two reference points and the auxiliary points with grayscale values consistent with the grayscale value of the reference point, comprises:

determining, in a same horizontal direction as the reference point and in a same vertical direction as the reference point, points with grayscale values consistent with the grayscale value of the reference point as the auxiliary points: determining midpoints of connection lines between the auxiliary points and a respective reference point among the at least two reference points; and determining the position information of the optical center according to the midpoints; or in a case where an optical spot where the optical center is located is circular, determining the position information of the optical center according to perpendicular bisectors of connection lines between the at least two reference points and respective auxiliary points.

2. The method according to claim 1, wherein determining the at least two reference points on the at least one reference line, wherein grayscale values of the at least two reference points are in the preset ratio to the grayscale peak value, comprises:

determining a target grayscale value according to a product of the grayscale peak value and the preset ratio; and determining on the at least one reference line, at least two points with grayscale values consistent with the target grayscale value as the at least two reference points.

3. The method according to claim 1, wherein a determination process of the preset ratio comprises:

determining a first difference value between the grayscale peak value and a grayscale value of a target endpoint on a reference line among the at least one reference line, wherein the target endpoint is an endpoint with a larger grayscale value among two endpoints of the reference line;

determining a product value of the first difference value and a preset coefficient and, determining a second difference value between the grayscale peak value and the product value, wherein the preset coefficient is in a range of (0, 1); and determining a ratio of the second difference value to the grayscale peak value as the preset ratio.

4. The method according to claim 1, wherein determining the position information of the optical center according to the midpoints comprises:

obtaining at least two auxiliary lines by connecting midpoints respectively belonging to disjoint connection lines among the connection lines; and determining the position information of the optical center according to an intersection point of the at least two auxiliary lines.

5. The method according to claim 4, wherein the at least two auxiliary lines comprise at least four auxiliary lines; and determining the position information of the optical center according to the intersection point of the at least two auxiliary lines comprises:

in a case where the at least four auxiliary lines have at least two intersection points, determining the position information of the optical center according to an average value of the at least two intersection points.

6. An electronic device, comprising a memory, a processor, and a computer program stored in the memory and executable on the processor, wherein when executing the computer program, the processor is configured to perform an optical center determination method comprising:

obtaining at least one reference line by connecting edge points with a largest distance therebetween in a target image;

determining at least two reference points on the at least one reference line, wherein grayscale values of the at least two reference points are in a preset ratio to a grayscale peak value, wherein the grayscale peak value is a maximum value among grayscale values of pixel points on the at least one reference line; and determining position information of an optical center according to the at least two reference points and auxiliary points with grayscale values consistent with a grayscale value of a reference point among the at least two reference points;

wherein determining the position information of the optical center according to the at least two reference points and the auxiliary points with grayscale values consistent with the grayscale value of the reference point, comprises:

determining, in a same horizontal direction as the reference point and in a same vertical direction as the reference point, points with grayscale values consistent with the grayscale value of the reference point as the auxiliary points; determining midpoints of connection lines between the auxiliary points and a respective reference point among the at least two reference points; and determining the position information of the optical center according to the midpoints; or in a case where an optical spot where the optical center is located is circular, determining the position information of the optical center according to perpendicular bisectors of connection lines between the at least two reference points and respective auxiliary points.

7. The electronic device according to claim 6, wherein determining the at least two reference points on the at least one reference line, wherein grayscale values of the at least two reference points are in the preset ratio to the grayscale peak value, comprises:

determining a target grayscale value according to a product of the grayscale peak value and the preset ratio; and determining on the at least one reference line, at least two points with grayscale values consistent with the target grayscale value as the at least two reference points.

8. The electronic device according to claim 6, wherein a determination process of the preset ratio comprises:

determining a first difference value between the grayscale peak value and a grayscale value of a target endpoint on a reference line among the at least one reference line, wherein the target endpoint is an endpoint with a larger grayscale value among two endpoints of the reference line;

determining a product value of the first difference value and a preset coefficient and, determining a second difference value between the grayscale peak value and the product value, wherein the preset coefficient is in a range of (0, 1); and determining a ratio of the second difference value to the grayscale peak value as the preset ratio.

9. The electronic device according to claim 6, wherein determining the position information of the optical center according to the midpoints comprises:

obtaining at least two auxiliary lines by connecting midpoints respectively belonging to disjoint connection lines among the connection lines; and determining the position information of the optical center according to an intersection point of the at least two auxiliary lines.

10. The electronic device according to claim 9, wherein the at least two auxiliary lines comprise at least four auxiliary lines; and determining the position information of the optical center according to the intersection point of the at least two auxiliary lines comprises:

in a case where the at least four auxiliary lines have at least two intersection points, determining the position information of the optical center according to an average value of the at least two intersection points.

11. A non-transitory computer-readable storage medium storing a computer program, wherein when the computer program is executed by a processor, the processor is configured to perform an optical center determination method comprising:

obtaining at least one reference line by connecting edge points with a largest distance therebetween in a target image;

determining at least two reference points on the at least one reference line, wherein grayscale values of the at least two reference points are in a preset ratio to a grayscale peak value, wherein the grayscale peak value is a maximum value among grayscale values of pixel points on the at least one reference line; and determining position information of an optical center according to the at least two reference points and auxiliary points with grayscale values consistent with a grayscale value of a reference point among the at least two reference points;

wherein determining the position information of the optical center according to the at least two reference points and the auxiliary points with grayscale values consistent with the grayscale value of the reference point, comprises:

determining, in a same horizontal direction as the reference point and in a same vertical direction as the reference point, points with grayscale values consistent with the grayscale value of the reference point as the auxiliary points; determining midpoints of connection lines between the auxiliary points and a respective reference point among the at least two reference points; and determining the position information of the optical center according to the midpoints; or in a case where an optical spot where the optical center is located is circular, determining the position information of the optical center according to perpendicular bisectors of connection lines between the at least two reference points and respective auxiliary points.

12. The non-transitory computer-readable storage medium according to claim 11, wherein determining the at least two reference points on the at least one reference line, wherein grayscale values of the at least two reference points are in the preset ratio to the grayscale peak value, comprises:

determining a target grayscale value according to a product of the grayscale peak value and the preset ratio; and determining on the at least one reference line, at least two points with grayscale values consistent with the target grayscale value as the at least two reference points.

13. The non-transitory computer-readable storage medium according to claim 11, wherein a determination process of the preset ratio comprises:

determining a first difference value between the grayscale peak value and a grayscale value of a target endpoint on a reference line among the at least one reference line, wherein the target endpoint is an endpoint with a larger grayscale value among two endpoints of the reference line;

determining a product value of the first difference value and a preset coefficient and, determining a second difference value between the grayscale peak value and the product value, wherein the preset coefficient is in a range of (0, 1); and determining a ratio of the second difference value to the grayscale peak value as the preset ratio.

14. The non-transitory computer-readable storage medium according to claim 11, wherein determining the position information of the optical center according to the midpoints comprises:

obtaining at least two auxiliary lines by connecting midpoints respectively belonging to disjoint connection lines among the connection lines; and determining the position information of the optical center according to an intersection point of the at least two auxiliary lines.

15. The non-transitory computer-readable storage medium according to claim 14, wherein the at least two auxiliary lines comprise at least four auxiliary lines; and determining the position information of the optical center according to the intersection point of the at least two auxiliary lines comprises:

in a case where the at least four auxiliary lines have at least two intersection points, determining the position information of the optical center according to an average value of the at least two intersection points.

* * * * *